March 1, 1932.  C. H. KINDL  1,847,764

SPEED CONTROL FOR ELECTRIC MOTORS

Filed Nov. 6, 1929

Inventor

CARL H. KINDL

By Spencer, Hardman and Fehr

Attorneys

Patented Mar. 1, 1932

1,847,764

UNITED STATES PATENT OFFICE

CARL H. KINDL, OF DAYTON, OHIO, ASSIGNOR TO DELCO PRODUCTS CORPORATION, OF DAYTON, OHIO, A CORPORATION OF DELAWARE

SPEED CONTROL FOR ELECTRIC MOTORS

Application filed November 6, 1929. Serial No. 405,131.

This invention relates to improvements in control devices for electric machines.

It is among the objects of the present invention to provide an electric machine with a device for controlling the speed thereof.

Further objects and advantages of the present invention will be apparent from the following description, reference being had to the accompanying drawings wherein a preferred embodiment of one form of the present invention is clearly shown.

Figure 1:
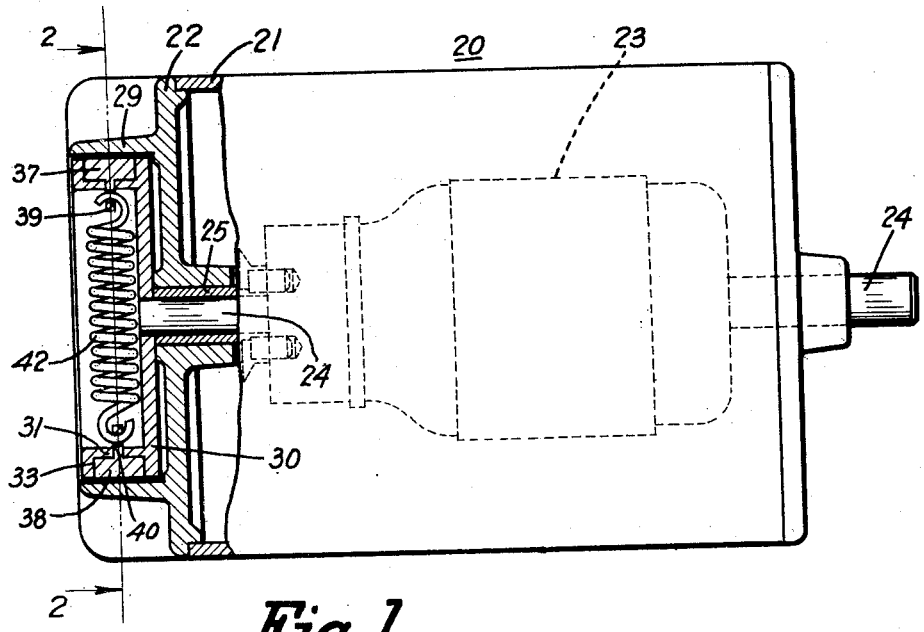
Fig. 1 is a fragmentary sectional view of an electric motor.

Referring to the drawings, the numeral 20 designates the electric motor comprising a frame portion 21 provided with end cover members 22. The rotatable armature 23 of the motor is shown in dotted lines, said armature being provided with a shaft 24 journalled in bearings provided by the end cover members 22. The bearing shown in section is designated by the numeral 25. The shaft 24 extends outside each end cover member 22 as shown in the Fig. 1. The end of the shaft extending outside the right end cover 22, as regards Fig. 1, is adapted to receive any suitable driving member, not shown. The other end of the shaft extends through bearing 25 to the outside of the left end cover member 22, as regards Fig. 1.

The left end cover member 22 is provided with an annular flange 29 extending from the outer surface thereof, said flange being substantially coaxial of the shaft 24. Shaft 24 has a disc 30 secured thereto in any suitable manner so as to rotate therewith. The disc 30 has an annular flange 31 substantially concentric of the annular flange 29 of the end cover member 22. An annular groove 33 is provided in the outer peripheral surface of the flange 31. At diametrically opposite points, as shown in the Fig. 2, flange 31 is provided with openings 34 and 35 respectively.

Figure 2:
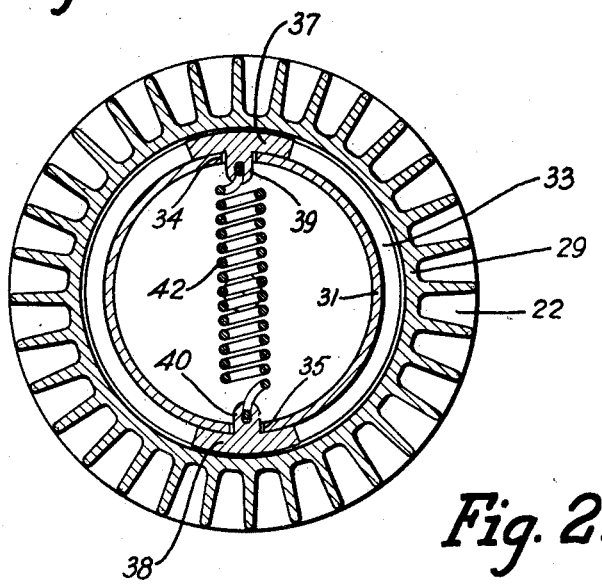
Fig. 2 is a sectional view taken along the line 2—2 of Fig. 1.

Within the annular groove 33 there are provided brake shoes 37 and 38, each having an extending ear portion 39 and 40 respectively, the ear portion 39 extending through the opening 34 in the flange 31 while the ear portion 40 extends through the opening 35 in said flange. Each ear portion is perforated for receiving a respective hook end of the tension spring 42 which is connected between said brake shoes, tending to maintain them against the bottom surface of the groove 33, or, out of engagement with the inner annular wall surface of the flange 29. In Fig. 2 it will be seen that the outer surface of each brake shoe is curved to coincide with the annular inner surface of the flange 29.

The device is inoperative as long as the motor is rotating within a predetermined range of speeds. However, if the rotating speed of the motor exceeds a predetermined rate, then the brake shoes will be moved outwardly by centrifugal force away from the axis of the disc 30 and against the inner annular surface of the end cover flange 29. The brake shoes will frictionally engage said flange and consequently retard the rotative movement of the motor armature 23, substantially preventing it from attaining excessive speeds beyond a proper value.

The idea provides a device of simple structure and design capable of being produced commercially at a minimum cost of time and material and effective to maintain the speed of the electric machine to which it is attached substantially at a desired speed.

The effectiveness of the device, or more particularly the speed at which said device becomes operative may be controlled by the changing of springs 42, a stiffer spring causing the device to cut in at a higher rate, a more resilient spring reducing the R. P. M. at which said device will become effective.

While the form of embodiment of the present invention as herein disclosed, constitutes a preferred form, it is to be understood that other forms might be adopted, all coming within the scope of the claims which follow.

What is claimed is as follows:

1. A control device for an electric machine, comprising in combination, a housing having an annular portion; a rotatable member supported within said housing and extending coaxially into the annular portion; a supporting disc carried by the rotatable member within the annular portion of the housing; recesses in said disc; a brake shoe in each of said recesses and movable radially relative to the supporting member so as to engage the annular portion of the housing; and a tension spring connected between said brake shoes normally urging them out of engagement with the said annular portion.

2. A control device for an electric machine, comprising in combination, a housing having an annular portion; a rotatable member supported within said housing and extending coaxially into the annular portion; a disc carried by the rotatable member within the annular portion of the housing said disc having an annular flange the outer peripheral surface of which has an annular groove, the flange being provided with diametrically opposite openings; brake shoes slidably carried in the annular groove of the disc each brake shoe having an ear extending through a respective opening in the flange of the disc; and a tension spring in said disc, the ends of the spring being anchored to the respective ears of the brake shoes.

3. A control device for an electric machine, comprising in combination, a housing, a rotatable member within said housing provided with a shaft, end members for said housing providing bearings for said shaft, one end member providing an annular flange on its outer surface coaxially of the shaft extending through its bearing, a disc secured to the shaft having an annular flange spaced from but concentric with the annular flange of the end member, said disc flange being provided with an annular groove and diametrically opposite openings, brake shoes supported in the groove of the disc, each brake shoe having an ear extending through a respective opening in said disc, said brake shoes being movable radially of the disc to engage the annular flange of the end member, and a tension spring connected between the ears of the oppositely disposed brake shoes, normally urging said shoes into the annular groove of the disc and out of engagement with the annular flange of the end member.

In testimony whereof I hereto affix my signature.

CARL H. KINDL.